Figure 4:
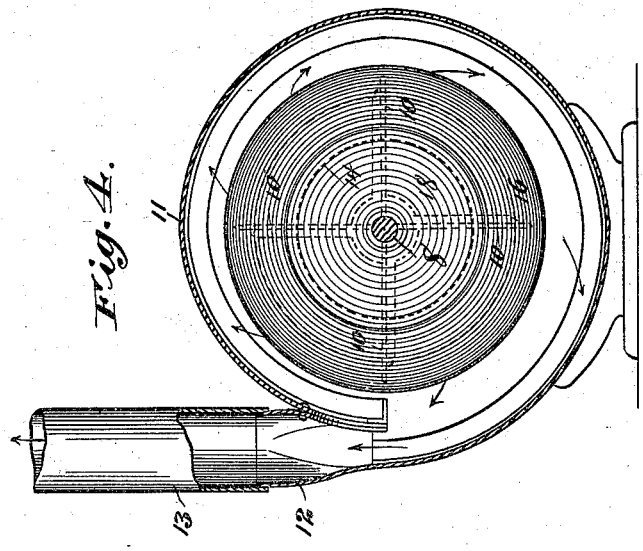

(No Model.)  W. R. MARSHALL.  3 Sheets—Sheet 1.
CENTRIFUGAL EXHAUST FAN AND CONCENTRATOR.
No. 550,797.  Patented Dec. 3, 1895.
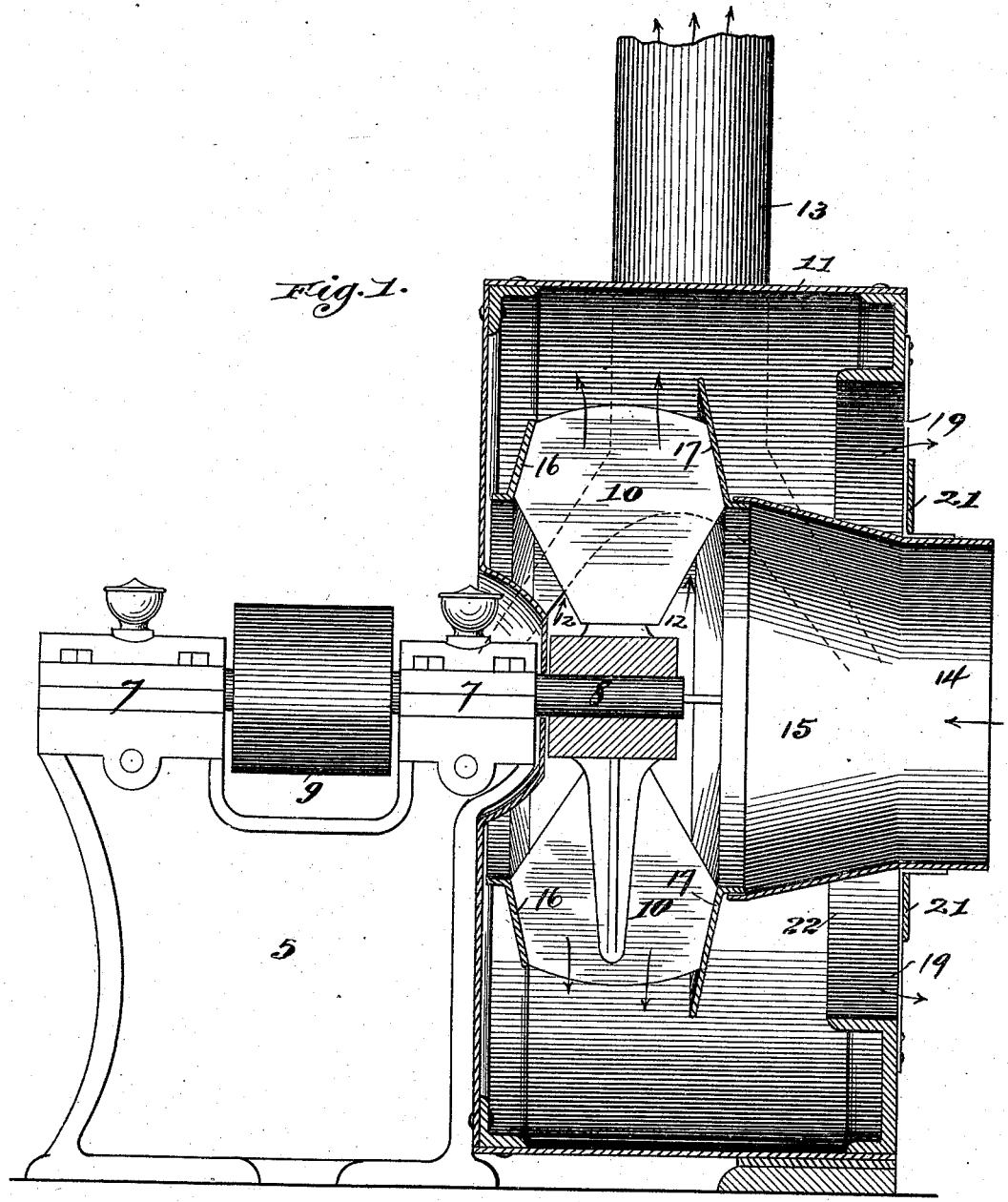

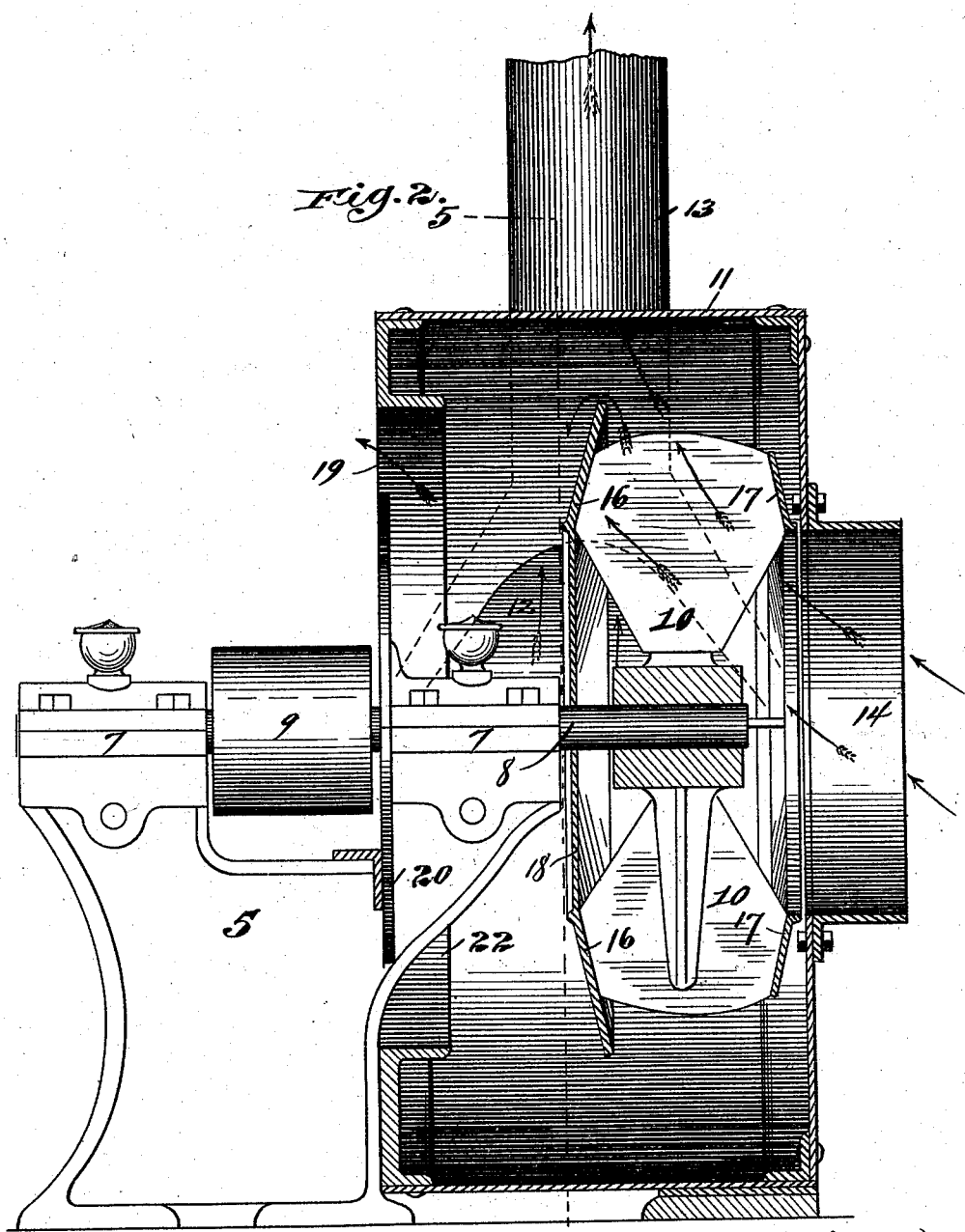

(No Model.) 3 Sheets—Sheet 3.

W. R. MARSHALL.
CENTRIFUGAL EXHAUST FAN AND CONCENTRATOR.

No. 550,797. Patented Dec. 3, 1895.

Witnesses,
Inventor,
William R. Marshall
By Offield, Towle & Linthicum
Attys.

UNITED STATES PATENT OFFICE.

WILLIAM R. MARSHALL, OF EAST SAGINAW, MICHIGAN.

CENTRIFUGAL EXHAUST-FAN AND CONCENTRATOR.

SPECIFICATION forming part of Letters Patent No. 550,797, dated December 3, 1895.

Application filed June 21, 1895. Serial No. 553,505. (No model.)

*To all whom it may concern:*

Be it known that I, WILLIAM R. MARSHALL, of East Saginaw, Michigan, have invented certain new and useful Improvements in Centrifugal Exhaust-Fans and Concentrators, of which the following is a specification.

This invention relates to a centrifugal exhaust-fan and concentrator intended for use in a system of collecting and conveying dust and other waste materials from one place to another by means of an air-current. Apparatus of this sort is now employed quite generally in collecting and conveying dust, shavings, and other waste from woodworking and other dust-producing machinery, and in connection with such apparatus there is used as a means for inducing and obtaining a current of air of high velocity a centrifugal exhaust-fan.

As my invention is intended for use in connection with the collecting and conveying of dust or shavings in woodworking and other dust-producing factories of all classes, I will first describe the common type of apparatus at present employed for such purpose as an aid to the better understanding of the improvements and inventions herein claimed. In collecting and conveying dust or shavings in such factories by means of air-currents the practice has been to employ hoods, which are placed over each dust-producing machine or cutter-head, and from the apex of each hood a small branch pipe leads to a main suction-pipe, the area of which is proportioned to the combined area of the several branch pipes delivering into such main suction-pipe. This main suction-pipe is connected to the suction-inlet, of at least equal area, of the common centrifugal exhaust-fan, and all the dust and waste received through the branch pipes from the several machines pass through the fan and are discharged from an opening in its periphery of an area about equal to that of the suction-inlet. A discharge-pipe of an area in cross-section equal to that of the main suction-pipe is connected to the discharge-outlet from the fan and leads to a dust-collector placed over a dust-vault or connected to a furnace-feeder. The air-current in the discharge-pipe is compressed by action of the fan, and this compression must be several ounces greater than atmospheric pressure and so maintained in order to convey the solid matter through the discharge-pipe, and it is obvious that the volume of air which supplies the discharge-pipe cannot be cut off from the suction of the fan, so as to reduce the velocity of the air-current in the discharge-pipe, as thereby the dust particles could not be carried in suspension and would settle to the bottom of the discharge-pipe and gradually fill it.

The power required to drive the fan is proportional to the volume and velocity of air-current propelled through the discharge-pipe. The greater the speed of the fan the greater the velocity and volume of air propelled by it and the more power it takes to drive the fan. It is therefore obvious that if a portion of the air now supplied to the suction-inlet of the fan can be cut off without reducing the velocity of the current in the discharge-pipe from the fan a saving of power may be effected.

The practice has been to supply all or most of the small branch pipes with cut-offs or "blast-gates," so called, so that when any of the machines are not running the branch pipes leading therefrom may be closed; but it is found in practice that only a small proportion of the branch pipes may be closed at one time, because if too much air is cut off from the fan in any way the discharge-pipe will not receive a sufficient volume of air to hold the dust particles in suspension. The result of shutting off some of the branch pipes in this manner would appear to be a cutting off of such proportional amount of air supplied to the suction-inlet of the fan; but this is not the fact, as it is found in practice that the partial vacuum produced at the eye of the fan-inlet is dependent upon the form and velocity of the fan-blades and the resistance to be overcome in the discharge-pipe, and that so long as the necessary volume and velocity of current is maintained in the discharge-pipe the volume of air necessary will be supplied through the small branch pipes that still remain open. In other words, a larger volume and higher velocity of air-currents will be maintained in the branch pipes that remain open than would be maintained in the several branch pipes when they are all open, and thus the cutting off of some of the pipes does not in practice operate to materially economize power.

The general practice is to employ in a common factory one large fan, to the suction-pipe of which are connected as many dust-producing machines as the fan is capable of caring for, and in such common practice the fan is run at the required speed constantly, even if one or more of the dust-producing machines attached to it are doing no work, and it often happens that the power consumed in driving the fan is greater than the power required to drive all of the dust-producing machines in actual operation.

From the foregoing it is obvious that if all the dust-producing machines that are connected to the suction of a fan be idle except one all of the pipes can be closed by the blast-gates except this one, thus shutting off about five-sixths of the volume of air supplied to the suction of the fan without materially affecting the dust-carrying capacity of the air escaping through the discharge-pipe, and a large saving of power can be effected.

No fan has been provided prior to my invention which could be applied practically in the manner above indicated. The known forms of fans are inapplicable for the reason, chiefly, that as constructed they require to deliver the whole volume of air through the discharge-outlet which they receive at the suction-inlet, and therefore the discharge-pipe has to be at least as large as the main suction-pipe. A separate discharge-pipe with a separate fan of the old type for each individual machine would be impracticable, because of the large amount of space required for conducting these large discharge-pipes through the factory, and if the dust-collectors were placed within the factory the collectors themselves would occupy too much room. Besides, the piping necessary to run each machine or group of small machines independently would entail a much larger expense for installation and maintenance than according to the methods already in use.

The various forms of fan dust-collectors are inapplicable for the reason, chiefly, that they are not adapted by the arrangement of their parts to subserve the essential purposes of the ordinary exhaust-fan for accumulating and delivering to distant points dust particles of considerable specific gravity and volume, such as it is desired to move from one point to another by a pneumatic system, but, on the contrary, are arranged for the specific purpose of separating as completely as possible very light dust particles from a slowly-moving air-current such as is employed in connection with middlings-purifiers, and as efficiency in separating the dust particles from the air is the only essential requirement in these fan dust-collectors no attention is paid to the numerous other requirements as to efficiency in an exhaust-fan concentrator.

The object of my invention is to provide a fan of improved construction which will subserve the purposes of an ordinary centrifugal exhaust-fan when used in a system of the kind above indicated, and which will further operate to separate and concentrate the dust and other solid particles delivered into it with the air and discharge such separated and concentrated particles at its periphery, together with sufficient air to carry such solid particles through a discharge-pipe either directly into a shavings-vault, to a furnace, or to a dust-collector, while permitting the surplus air taken in at the suction-inlet to escape at one side of the fan between the eye and periphery of the fan-case, instead of removing the entire volume of air from the interior of the building or conveying and discharging it at a considerable distance from the fan. Such improved fan therefore operates as a preliminary dust-concentrator, and one may be used in connection with each dust-producing machine or set of machines, so that it need not run except when the machine with which it is in connection is running, and I may drive such fan from a shaft of the dust-producing machine and so arrange the gearing that the throwing of the machine out of action likewise throws the fan out of action.

My invention, in its broadest scope, consists of a centrifugal exhaust-fan and concentrator capable of fulfilling all of the requirements of the ordinary centrifugal exhaust-fan and with equal efficiency and of performing, also, certain additional functions—namely, the concentration of the dust particles, a partial separation of the dust and air, and a liberation of the surplus air-current in a purified condition from the concentrator simultaneous with the delivery of the concentrated dust and its carrying-current with sufficient force to carry such concentrated dust to a distance.

My improved fan and concentrator is readily adaptable to varying conditions of use—as, for example, in the number of machines with which it is connected and in the volume of air delivered thereto, and by reason of the partial separation effected within the fan-concentrator and a discharge of a portion of the air from the concentrator a material saving in power, space, and cost of installation is effected as compared with the centrifugal exhaust-fans now in use for accomplishing the same purposes.

The machine which forms the practical embodiment of my invention has a fan-case circular in outline, a free and unobstructed inlet for the dust-laden current, a fan-wheel mounted to rotate within the fan-case, a plate arranged at the side of the fan-blades, a peripheral discharge-opening for the concentrated dust, and a sufficient carrying-current therefor, arranged, preferably, in the plane of the rotating fan-wheel, and an outlet for the surplus air taken into the fan when the inlet is fully open, such outlet being so arranged and located as not to interfere with the free and efficient action of the fan-wheel in producing the partial vacuum at its eye, which is required to induce the dust-gathering current in the suction-pipes.

I have shown three forms of construction in the accompanying drawings, in which—

Figure 3:
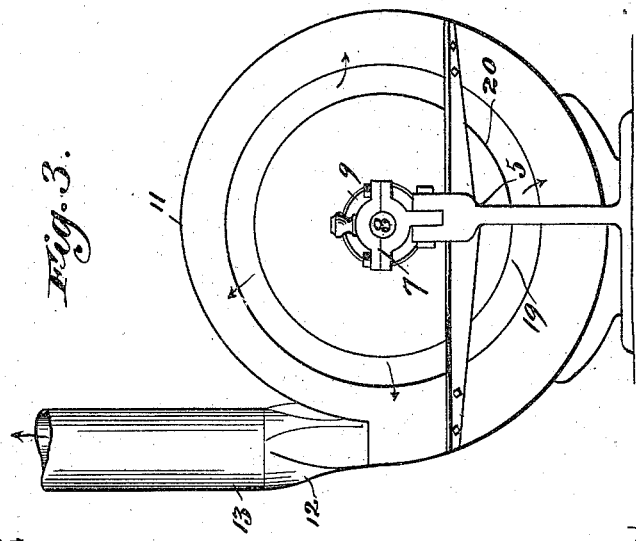

Figure 1 is a transverse sectional elevation through the fan-case on the line of the fan-shaft and showing the purified-air outlet concentric with the inlet. Fig. 2 shows a construction wherein the purified-air outlet is arranged in the side wall of the fan-case opposite the inlet. Fig. 3 is a side elevation of the form shown in Fig. 2, and Fig. 4 is a sectional elevation on the line 5 5 of Fig. 2.

In the drawings, 5 represents the frame, which is adapted to provide bearings 7 and 7 for the fan-shaft 8, which shaft is driven by a belt on the pulley 9.

10 represents the blades of the fan, which must not be less than four in number, six being preferred; 11, the peripheral wall of the fan-case, which is substantially circular in form and having a discharge-spout 12 and a discharge-pipe 13. The fan-case is greater in transverse diameter than the diameter of the fan-wheel.

In the construction shown in Fig. 1 the fan is located at the opposite side of the case from the suction-inlet. As shown in Fig. 2, the fan is located at that side of the fan-case nearest the suction-inlet.

14 represents the suction-inlet pipe. As shown in Fig. 1, this inlet-pipe projects into the interior of the fan-case and has the flaring-mouth portion 15.

16 17 represent annular plates which conform to the beveled sides of the outer ends of the fan-blades and to which they may or may not be secured, so as to prevent the air from escaping laterally and cause it to whirl around the periphery of the case. If the annular plates or diaphragms are not secured to the fan-blades, they may be secured to the fan-case, so as not to revolve with the fan-wheel. As shown in Figs. 1 and 3, one of these plates has a flange encircling the flaring end of the suction-inlet pipe, and the side wall of the fan-case prevents the dust-laden air-current from passing directly through the fan; but, as shown in Fig. 2, where a purified-air outlet is arranged in the side wall of the fan-case opposite the inlet, the central portion of the fan-wheel opposite the inlet is closed by the disk 18, which may be formed integrally with or separately from the plate 16.

19 represents the purified-air outlet. As shown in Fig. 1, the purified-air outlet is arranged concentric with the suction-inlet pipe. As shown in Fig. 2, the outlet is arranged in the opposite wall of the fan-case.

The zone of the purified or surplus air outlet must extend beyond the outer ends of the fan-blades and toward the peripheral wall of the fan-case in order to prevent undue friction of the air particles upon themselves, which friction will rapidly increase the temperature of the air-current and prevent the fan-wheel from discharging its function with efficiency, even if the area or diameter of this outlet-opening is much greater than that of the suction-inlet.

In order to prevent ingoing currents of air, the central portion of the purified-air outlet is preferably closed, so as to narrow said outlet to the form of an annular slot. As shown in Fig. 1, this is done by providing the disk 20, which may be divided centrally and formed with the inner members of the journal-box of the fan-shaft. Where the purified-air outlet is arranged concentric with the suction-tube, the latter closes the central portion of the aperture and may have the additional flange 21, further reducing the size of the opening. The purified-air outlet has the inwardly-projecting tubular guard 22. In both of the constructions the volume of dust-laden air is delivered at the eye of the fan and is given a rapid whirling or circular motion, being driven toward the fan-case and prevented from escaping at the sides of the fan by the annular plates.

Obviously the purified-air outlet or outlets are not necessarily continuous, but may be provided with a number of small openings located in the side of the fan-case in the same zone as the continuous outlet near the periphery of the fan-case. The tubular guard serves to prevent the escape of any dust particles carried by the air-current to the side wall of the fan-case in which the purified-air outlet is formed. The discharge-opening in the fan-case is practically the same in both of the forms of construction shown. About one-quarter of the circumference of the peripheral wall of the case is struck on a circle of larger radius than the remainder, so that the two ends of this wall do not meet in the same plane, but overlap, and the opening between these overlapped ends is reduced in area by a tapering base-section, forming a discharge-spout for the concentrated dust and its carrying-current, to which the discharge-pipe may be secured.

The operation of both of the forms of construction is practically the same. The dust-laden air-current being delivered to the eye of the fan is given a rotary movement by the rapid rotation of the fan-blades. Acting under the laws of centrifugal force the heavier particles carried in this current are thrown to the periphery of the fan-case and traveling around the chamber escape through the peripheral discharge-opening into the discharge-pipe, always with a sufficient amount of air to carry them through said pipe. The surplus volume of air being thus freed from the dust particles and seeking to escape flows over the side of the diaphragm at the side of the fan-blades and issues through the annular escape-opening in the side wall of the fan-case. When proportioned substantially as shown in the drawings and the inlet is fully open, about one-sixth of the air will escape with the concentrated dust through the discharge-pipe, while about five-sixths of the air-current which is delivered to the fan will be practically freed from dust and escape out of the fan-case through the surplus-air-discharge opening. The former may be delivered to a centrifugal dust-collector or a receptacle for the dust. The fan itself may be connected with any dust-producing machine, and it may be driven, as before stated, directly from the shaft of said machine or from a counter-shaft, so as to operate only when the machine is in operation.

The principal advantages resulting from the use of my improved centrifugal exhaust-fan and concentrator are, first, that the greater proportion of the air-current necessary to take away the dust from the dust-producing machine may be freed from dust within such concentrator and delivered back into the same compartment or room from which it is drawn; second, the volume of air which is delivered from the concentrator with the dust is so small that it may be delivered to a small dust-collector arranged in any convenient place about the factory, and when any portion of the suction-pipes are closed with blast-gates there is always a constant and sufficient discharge of air taking place through the discharge-pipe to carry in suspension any dust particles which are taken into the suction-inlet of the fan; third, the dust and waste products of a number of machines may be cared for at a much less expenditure of power than in the older systems, where the preliminary separation and practical concentration of the dust are not provided for, and, fourth, there will be a decided economy in the heating of the factory in cold weather, due to the fact that but a small portion of the air is withdrawn from the factory.

In my application filed May 21, 1895, Serial No. 550,159, I have shown my improved exhaust-fan and concentrator herein described and claimed embodied in a dust-collecting system and have made claims to combinations including my exhaust-fan and concentrator as an element.

Having thus described my invention and shown the practical embodiments thereof, I do not wish to be understood as confining my invention to details of construction or generally to structural features.

I claim—

1. A centrifugal exhaust fan and concentrator, comprising in combination, a fan case of circular outline and having an imperforate peripheral wall, a fan wheel mounted to rotate within the case, a side plate or diaphragm arranged at the side of the fan blades, said fan wheel being smaller in diameter than the fan case whereby to provide a space between the outer ends of the fan blades and the fan case free from obstruction and in which the air current generated by the fan wheel may revolve, an inlet opening communicating with the eye of the fan wheel, a dust and air discharge opening in the peripheral wall of the fan case adapted to receive a discharge pipe of sufficient area to deliver the concentrated dust and its carrying current, a surplus air outlet in the side of the fan case through which the discharge of surplus air not required to carry the dust may escape in a purified condition, the zone of the surplus air outlet extending beyond the outer ends of the fan blades and toward the peripheral wall of the fan case, substantially as shown and described.

2. A centrifugal exhaust fan and concentrator, comprising in combination, a fan case approximately circular in cross section having an imperforate peripheral wall and one side closed with a head, a fan wheel rotatably mounted within the case, said fan wheel being smaller in diameter than the fan case whereby to provide a space between the outer ends of the fan blades and the fan case free from obstruction and in which the air current generated by the fan wheel may move, an annular side plate or diaphragm arranged at the side of the fan blades opposite from the closed head of the fan case, an inlet pipe communicating with the eye of the fan wheel through the central opening of the annular diaphragm at its side, a dust and air discharge opening in the peripheral wall of the fan case adapted to receive a discharge pipe of sufficient area to deliver the concentrated dust and its carrying current, a surplus air outlet in the side of the fan case concentric with the air inlet pipe through which the discharge of surplus air not required to carry the dust may escape in a purified condition, the zone of the surplus air outlet extending beyond the outer end of the fan blades and toward the peripheral wall of the fan case, substantially as shown and described.

3. A centrifugal exhaust fan and concentrator, comprising in combination a fan case approximately circular in cross section having an imperforate peripheral wall and one side closed with a head, a fan wheel rotatably mounted within the case with an annular side plate or diaphragm arranged at the side of the fan blades opposite from the closed head of the fan case, said fan wheel being smaller in diameter than the fan case whereby to provide a space between the outer ends of the fan blades and the fan case free from obstruction and in which the air current generated by the fan wheel may move, an axial inlet pipe communicating with the eye of the fan wheel through the central opening of the annular diaphragm at its side, a dust and air discharge opening arranged in the peripheral wall of the fan case in the plane of rotation of the fan wheel and adapted to receive a discharge pipe of sufficient area to deliver the concentrated dust and its carrying current, a surplus air outlet in the side of the fan case concentric with the air inlet pipe with a tubular guard secured to the outer edge thereof, through which the discharge of surplus air not required to carry the dust may escape in a purified condition, the zone of the surplus air outlet extending beyond the outer ends of the fan blades and toward the peripheral wall of the fan case, substantially as shown and described.

4. A centrifugal exhaust fan and concentrator, comprising in combination, a fan case of circular outline and having an imperforate peripheral wall, a fan wheel mounted to rotate within the case, said fan wheel being smaller in diameter than the fan case whereby to provide a space between the outer ends of the fan blades and the fan case free from obstruction and in which the air current generated by the fan wheel may revolve, an inlet opening communicating with the eye of the fan wheel, a dust and air discharge opening in the peripheral wall of the fan case adapted to receive a discharge pipe of sufficient area to deliver the concentrated dust and its carrying current, a surplus air outlet in the side of the fan case through which the discharge of surplus air not required to carry the dust may escape in a purified condition, the zone of the surplus air outlet extending beyond the outer ends of the fan blades and toward the peripheral wall of the fan case, substantially as shown and described.

WILLIAM R. MARSHALL.

Witnesses:
   J. C. AMES,
   G. M. REYNOLDS.